(12) United States Patent
Chin et al.

(10) Patent No.: US 12,328,064 B2
(45) Date of Patent: Jun. 10, 2025

(54) NOISE SUPPRESSION METHOD AND APPARATUS FOR TOTEM POLE PFC CIRCUIT, AND ELECTRONIC DEVICE

(71) Applicant: Huawei Digital Power Technologies Co., Ltd., Shenzhen (CN)

(72) Inventors: Ken Chin, Shenzhen (CN); Shanglin Mo, Dongguan (CN); Shuaibing Wang, Dongguan (CN); Liangyun Kang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 120 days.

(21) Appl. No.: 18/346,679

(22) Filed: Jul. 3, 2023

(65) Prior Publication Data

US 2024/0014731 A1 Jan. 11, 2024

(30) Foreign Application Priority Data

Jul. 5, 2022 (CN) .......................... 202210783645.1

(51) Int. Cl.
*H02M 1/42* (2007.01)
*H02M 1/00* (2007.01)

(52) U.S. Cl.
CPC ....... *H02M 1/4233* (2013.01); *H02M 1/0038* (2021.05)

(58) Field of Classification Search
CPC .......................... H02M 1/0038; H02M 1/4233
See application file for complete search history.

(56) References Cited

U.S. PATENT DOCUMENTS

| | | | |
|---|---|---|---|
| 10,186,955 B2 | 1/2019 | Jitaru et al. | |
| 11,323,023 B2* | 5/2022 | Yamane | H02M 1/4208 |
| 2015/0303791 A1* | 10/2015 | Jin | H02M 7/06 363/126 |
| 2020/0195131 A1* | 6/2020 | Masich | H03K 3/0377 |
| 2022/0209653 A1* | 6/2022 | Fu | H02M 1/0085 |
| 2023/0089905 A1* | 3/2023 | Jiang | H02M 1/44 363/13 |

OTHER PUBLICATIONS

Baihua Zhang et al., "Conducted Noise Prediction for Zero-crossing Issue in Totem-pole Bridgeless PFC Converter", Dec. 14, 2017, total 6 pages.
Do Nguyen-Nghia et al., "Design and Implementation of a Control Method for GaN-based Totem-Pole Boost-type PFC Rectifier in Energy Storage Systems", Sep. 29, 2020 (Sep. 29, 2020), 18 pages.

* cited by examiner

*Primary Examiner* — Jue Zhang
(74) *Attorney, Agent, or Firm* — Slater Matsil, LLP

(57) ABSTRACT

A noise suppression method and apparatus for a totem pole power factor correction (PFC) circuit and an electronic device are provided. In response to a determination that an alternating current of the totem pole PFC circuit is switched at a zero crossing, a control signal is sent to a switch that enables a PFC inductor in the totem pole PFC circuit to charge or discharge. After the switch is turned off for a first period of time, the switch is turned on again for a second period of time.

20 Claims, 8 Drawing Sheets

NOISE SUPPRESSION METHOD AND APPARATUS FOR TOTEM POLE PFC CIRCUIT, AND ELECTRONIC DEVICE

CROSS-REFERENCE TO RELATED APPLICATION

This application claims priority to Chinese Patent Application No. 202210783645.1, filed on Jul. 5, 2022, which is hereby incorporated by reference in its entirety.

TECHNICAL FIELD

The present invention relates to the field of electrical energy conversion technologies, and in particular, to a noise suppression method and apparatus for a totem pole PFC circuit, and an electronic device.

BACKGROUND

A power factor means a relationship between effective power and total power consumption (apparent power), namely, a ratio of the effective power to the total power consumption, and is one of important indicators for measuring performance of a power-consuming device, for example, a component or an electronic device. Therefore, a value of the power factor may be used to determine a degree to which electrical power of the power-consuming device is effectively utilized. A larger value of the power factor indicates higher electrical power utilization and better performance of the power-consuming device.

Power factor correction (PFC) is a common technology in the field of power supply. A current PFC circuit has problems such as low efficiency, a low switching frequency, and an excessive volume of a magnetic component. Therefore, a totem pole PFC circuit is proposed in the conventional technology, to resolve the problems of the current PFC circuit. However, as an alternating current is input into an input end of the totem pole PFC circuit, when the alternating current switches from a positive half cycle to a negative half cycle or from a negative half cycle to a positive half cycle, a surge current is generated and causes a switch in the totem pole PFC circuit to trigger an overcurrent protection mechanism, and the switch is in an off state. Consequently, the totem pole PFC circuit works abnormally.

SUMMARY

To resolve the foregoing problem, embodiments of this application provide a noise suppression method and apparatus for a totem pole PFC circuit, and an electronic device. When an input alternating current of the totem pole PFC circuit is switched at zero crossing, a power frequency switch in the totem pole PFC circuit is controlled to be turned on first, a PFC inductor in the totem pole PFC circuit discharges, and a common mode current is generated when various parasitic capacitors in the totem pole PFC circuit charge or discharge. After the power frequency switch is turned off for a period of time, the power frequency switch is turned on again, and a high frequency switch is turned on. In this case, the PFC inductor in the totem pole PFC circuit charges to generate a differential mode current. Charge or discharge time of the parasitic capacitor in the totem pole PFC circuit is staggered with energy storage time of a PFC inductor L, to avoid superposition of a charge or discharge current of the parasitic capacitor and an energy storage current of the PFC inductor L, thereby reducing a surge current of the totem pole PFC circuit.

Therefore, embodiments of this application use the following technical solutions.

According to a first aspect, this application provides a noise suppression method for a totem pole PFC circuit, where the method is performed by a controller, and includes: sampling alternating current at an input end of the totem pole PFC circuit; sending a control signal to a third switch or a fourth switch when it is determined that a voltage of the alternating current at the input end is switched at zero crossing, where zero-cross switching means that the voltage of the alternating current switches from a positive half cycle to a negative half cycle or from a negative half cycle to a positive half cycle, the third switch is a switch that enables the PFC inductor in the totem pole PFC circuit to charge or discharge when the voltage of the alternating current is in the negative half cycle, the fourth switch is a switch that enables the PFC inductor to charge or discharge when the voltage of the alternating current is in the positive half cycle, and the control signal is used to enable the third switch or the fourth switch to be in an on state; stopping sending the control signal to the third switch or the fourth switch after the switch is on for a set period of time; and sending the control signal to the third switch or the fourth switch after the switch is off for a set period of time.

In this implementation, when the input alternating current of the totem pole PFC circuit is switched at zero crossing, the third switch or the fourth switch used as a power frequency switch is turned on, a PFC inductor in the totem pole PFC circuit discharges, and a common mode current is generated when various parasitic capacitors in the totem pole PFC circuit charge or discharge. After the third switch or the fourth switch is turned on for the set period of time, the third switch or the fourth switch is turned off. The third switch or the fourth switch is turned off for the set period of time, and is turned on again, so that the PFC inductor in the totem pole PFC circuit charges to generate a differential mode current. In this application, charge or discharge time of the parasitic capacitor in the totem pole PFC circuit is staggered with energy storage time of a PFC inductor L, to avoid superposition of the common mode current and the differential mode current in the totem pole PFC circuit, thereby reducing a surge current of the totem pole PFC circuit. When the surge current is reduced, a switch does not trigger an overcurrent protection mechanism, and the totem pole PFC circuit can work normally.

In an implementation, after the sending a control signal to a third switch when it is determined that a voltage of the input alternating current is switched at zero crossing, the method further includes: sending the control signal to a second switch, where the second switch is a switch that enables the PFC inductor to discharge when the voltage of the alternating current is in the negative half cycle, or a switch that enables the PFC inductor to charge when the voltage of the alternating current is in the positive half cycle; or after the sending a control signal to a fourth switch when it is determined that a voltage of the input alternating current is switched at zero crossing, the method further includes: sending the control signal to a first switch, where the first switch is a switch that enables the PFC inductor to charge when the voltage of the alternating current is in the negative half cycle, or a switch that enables the PFC inductor to discharge when the voltage of the alternating current is in the positive half cycle.

In this implementation, when the third switch or the fourth switch is turned on for a first time, the first switch or the second switch may be turned on, so that the PFC inductor in the totem pole PFC circuit discharges. A current generated the PFC inductor discharges may enable the various parasitic capacitors in the totem pole PFC circuit to charge or discharge, so that the various parasitic capacitors in the totem pole PFC circuit generate the common mode current.

In an implementation, after the sending the control signal to the third switch after the switch is off for a set period of time, the method further includes: sending the control signal to the first switch; or after the sending the control signal to the fourth switch after the switch is off for a set period of time, the method further includes: sending the control signal to the second switch.

In this implementation, when the third switch or the fourth switch is turned on for a second time, the second switch or the first switch may be turned on, and the PFC inductor in the totem pole PFC circuit charges, so that the PFC inductor in the totem pole PFC circuit generates the differential mode current.

In an implementation, the third switch and the fourth switch each include a MOS transistor, and before or after the sending a control signal to a third switch or a fourth switch when it is determined that a voltage of the alternating current at the input end is switched at zero crossing, the method further includes: increasing a resistance of a gate of the MOS transistor in the third switch or the MOS transistor in the fourth switch.

In this implementation, if the third switch and the fourth switch include the MOS transistors, to reduce the surge current in the totem pole PFC circuit, drive resistances of gates of the MOS transistors in the third switch and the fourth switch may be increased, so that a conduction speed of a common mode current passing through the third switch or the fourth switch can be reduced, and a common mode current in a common mode current circuit is staggered from a common mode current in another common mode current circuit, thereby reducing the surge current in the totem pole PFC circuit.

According to a second aspect, an embodiment of this application provides a noise suppression apparatus for a totem pole PFC circuit, including a totem pole PFC circuit, an input voltage detection unit, and a control unit. The input voltage detection unit is configured to: sample an alternating current at an input end of the totem pole PFC circuit, and input a voltage of the alternating current to the control unit; the control unit is configured to: send a control signal to a third switch or a fourth switch when it is determined that the voltage of the alternating current at the input end is switched at zero crossing, where zero-cross switching means that the voltage of the alternating current switches from a positive half cycle to a negative half cycle or from a negative half cycle to a positive half cycle, the third switch is a switch that enables the PFC inductor in the totem pole PFC circuit to charge or discharge when the voltage of the alternating current is in the negative half cycle, the fourth switch is a switch that enables the PFC inductor to charge or discharge when the voltage of the alternating current is in the positive half cycle, and the control signal is used to enable the third switch or the fourth switch to be in an on state; stop sending the control signal to the third switch or the fourth switch after the switch is on for a set period of time; and send the control signal to the third switch or the fourth switch after the switch is off for a set period of time.

In an implementation, the control unit is further configured to: send the control signal to a second switch after the sending a control signal to a third switch when it is determined that a voltage of the input alternating current is switched at zero crossing, where the second switch is a switch that enables the PFC inductor to discharge when the voltage of the alternating current is in the negative half cycle, or a switch that enables the PFC inductor to charge when the voltage of the alternating current is in the positive half cycle; or send the control signal to a first switch after the sending a control signal to a fourth switch when it is determined that a voltage of the input alternating current is switched at zero crossing, where the first switch is a switch that enables the PFC inductor to charge when the voltage of the alternating current is in the negative half cycle, or a switch that enables the PFC inductor to discharge when the voltage of the alternating current is in the positive half cycle.

In an implementation, the control unit is further configured to: send the control signal to the first switch after the sending the control signal to the third switch after the switch is off for a set period of time; or send the control signal to the second switch after the sending the control signal to the fourth switch after the switch is off for a set period of time.

In an implementation, the third switch and the fourth switch each include a MOS transistor, and the control unit is further configured to increase a resistance of a gate of the MOS transistor in the third switch or the MOS transistor in the fourth switch.

According to a third aspect, an embodiment of this application provides an electronic device, including the noise suppression apparatus for the totem pole PFC circuit that may be implemented according to the second aspect. The electronic device may be a base station, a charging pile, a switch, an electric vehicle, or the like. This is not limited in this application.

BRIEF DESCRIPTION OF DRAWINGS

The following briefly describes the accompanying drawings that need to be used in the descriptions of embodiments or a conventional technology.

DESCRIPTION OF EMBODIMENTS

The following describes technical solutions in embodiments of this application with reference to the accompanying drawings in embodiments of this application.

The term "and/or" in this specification describes an association relationship between associated objects and represents that three relationships may exist. For example, A and/or B may represent the following three cases: Only A exists, both A and B exist, and only B exists. The character "/" in this specification indicates an "or" relationship between the associated objects. For example, A/B indicates A or B.

In the description and claims of this specification, the terms "first", "second", and the like are intended to distinguish between different objects, but do not indicate a particular order of the objects. For example, a first response message, a second response message, and the like are used to distinguish between different response messages, but do not indicate a particular order of the response messages.

In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In the descriptions of embodiments of this application, unless otherwise specified, "a plurality of" means two or more. For example, a plurality of processing units are two or more processing units, and a plurality of elements are two or more elements.

Figure 1:
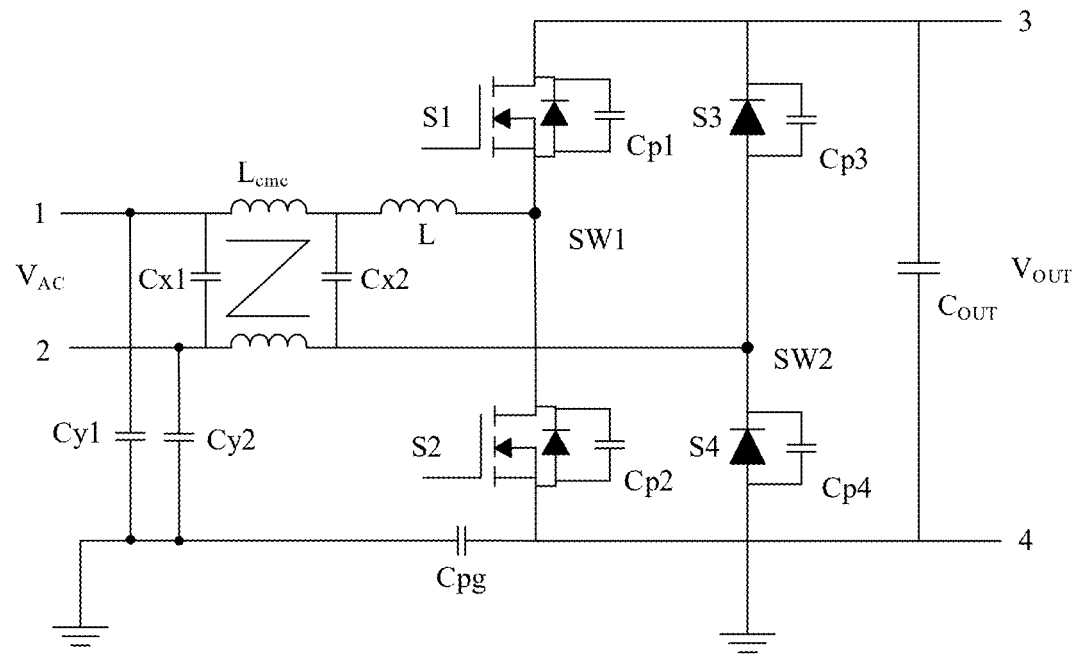
FIG. 1 is a schematic diagram of a structure of a totem pole PFC circuit in the conventional technology.

FIG. 1 is a schematic diagram of a structure of a totem pole PFC circuit in the conventional technology. As shown in FIG. 1, the totem pole PFC circuit includes an input end 1, an input end 2, a PFC inductor L, a common mode inductor Leme, a switch S1, a switch S2, a switch S3, a switch S4, a filter capacitor $C_{OUT}$, a parasitic capacitor Cp1 of the switch S1, a parasitic capacitor Cp2 of the switch S2, a parasitic capacitor Cp3 of the switch S3, a parasitic capacitor Cp4 of the switch S4, an X capacitor to ground Cx1, an X capacitor to ground Cx2, a Y capacitor to ground Cy1, a Y capacitor to ground Cy2, an equivalent capacitor to ground Cpg, an output end 3, and an output end 4.

The input end 1 and the input end 2 may be electrically connected to an external power supply. The output end 3 and the output end 4 may be electrically connected to a plurality of loads. The switch S1 and the switch S2 are connected in series, and the switch S1 and the switch S2 are electrically connected between the output end 3 and the output end 4. The switch S3 and the switch S4 are connected in series, and the switch S3 and the switch S4 are electrically connected between the output end 3 and the output end 4. The filter capacitor $C_{OUT}$ is electrically connected between the output end 3 and the output end 4. The input end 1 is electrically connected to a node SW1 between the switch S1 and the switch S2 through the common mode inductor Leme and the PFC inductor L. The input end 2 is electrically connected to a node SW2 between the switch S3 and the switch S4 through the common mode inductor Leme.

One end of the equivalent capacitor to ground Cpg is electrically connected between the switch S2 and the output end 4, and the other end is grounded. One end of the Y capacitor to ground Cy1 is electrically connected to the input end 1, and the other end is electrically connected to the grounded end of the equivalent capacitor to ground Cpg. One end of the capacitor Cy2 to ground Y is electrically connected to the input end 2, and the other end is electrically connected to the grounded end of the equivalent capacitor to ground Cpg. The X capacitor to ground Cx1 and the X capacitor to ground Cx2 are electrically connected between the output end 1 and the input end 2 respectively, and are located on two sides of the common mode inductor Leme respectively.

Figure 2A:
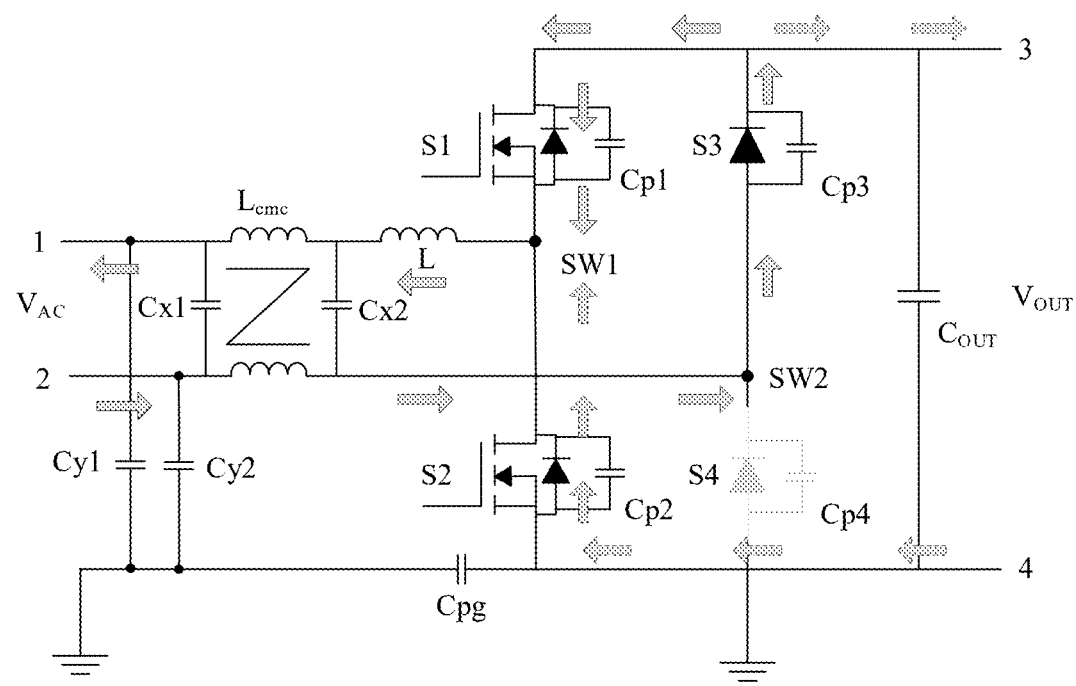
FIG. 2(a) is a schematic diagram of a current flow direction in another totem pole PFC circuit in the conventional technology.

As shown in FIG. 2(a), an input voltage $V_{AC}$ of the totem pole PFC circuit is in a negative half cycle, and VAC<0. In other words, the input end 1 is negative, and the input end 2 is positive. In this case, the switch S3 in the totem pole PFC circuit is turned on, and the switch S4 is turned off. The switch S1 is turned on as a main switch to enable the PFC inductor L to charge. The switch S2 is turned on as a secondary switch to enable the PFC inductor L to discharge. In the totem pole PFC circuit, a current sequentially flows through the following components: the input end 2→the common mode inductor Leme→the node SW2→the switch S3→the switch S1 (or the output end 3→the output end 4→the switch S2)→the node SW1→the PFC inductor L→the common mode inductor Leme→the input end 1. In this case, a voltage $V_{SW2}$ at the node SW2 is equal to the output voltage $V_{OUT}$.

Figure 2B:
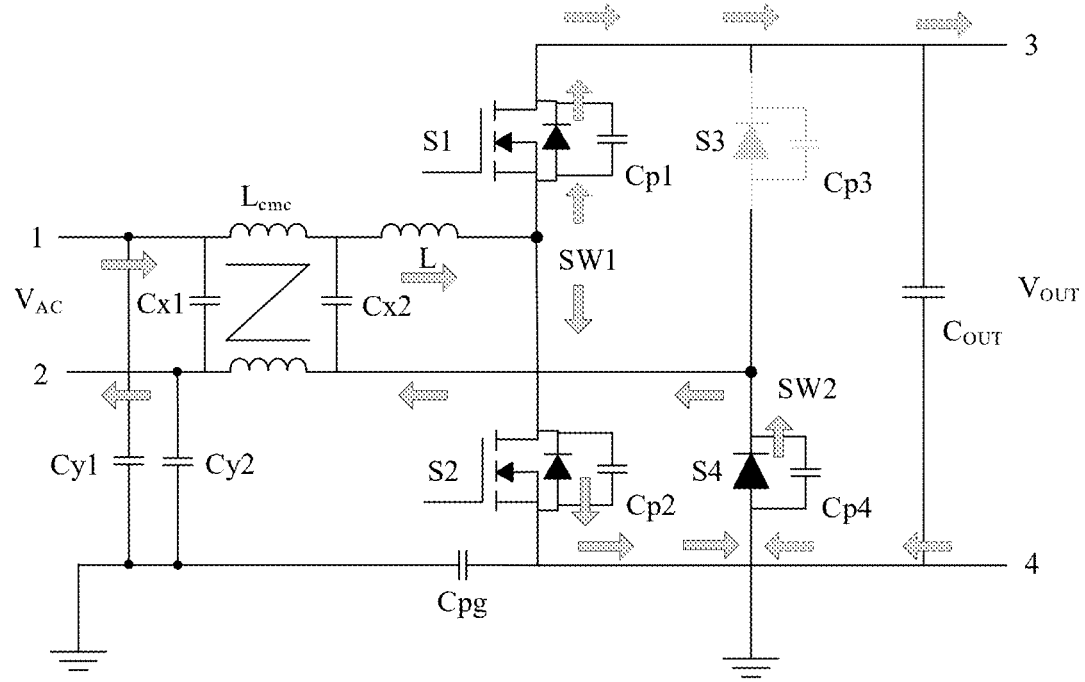
FIG. 2(b) is a schematic diagram of a current flow direction in another totem pole PFC circuit in the conventional technology.

As shown in FIG. 2(b), the input voltage $V_{AC}$ of the totem pole PFC circuit is in a positive half cycle, and $V_{AC}$>0. In other words, the input end 1 is positive, and the input end 2 is negative. In this case, the switch S4 in the totem pole PFC circuit is turned on, and the switch S3 is turned off. The switch S2 is turned on as a main switch to enable the PFC inductor L to charge. The switch S1 is turned on as a secondary switch to enable the PFC inductor L to discharge. In the totem pole PFC circuit, a current sequentially flows through the following components: the input end 1→the common mode inductor Leme→the PFC inductor L→the node SW1→the switch S2 (or the switch S1→the output end 3→the output end 4)→the switch S4→the node SW2→the common mode inductor Leme→the input end 2. In this case, the voltage $V_{SW2}$ at the node SW2 is equal to the output voltage 0 V.

When the input voltage $V_{AC}$ of the totem pole PFC circuit is switched at zero crossing, the switch S3 and the switch S4 are turned on in turn, and the voltage $V_{SW2}$ at the node SW2 changes from 0 V to $V_{OUT}$ (or from $V_{OUT}$ to 0 V). During this transient switching, a surge current is generated in the totem pole PFC circuit. Zero-cross switching refers that an alternating current switches from a positive half cycle to a negative half cycle, or from a negative half cycle to a positive half cycle.

Figure 2C:
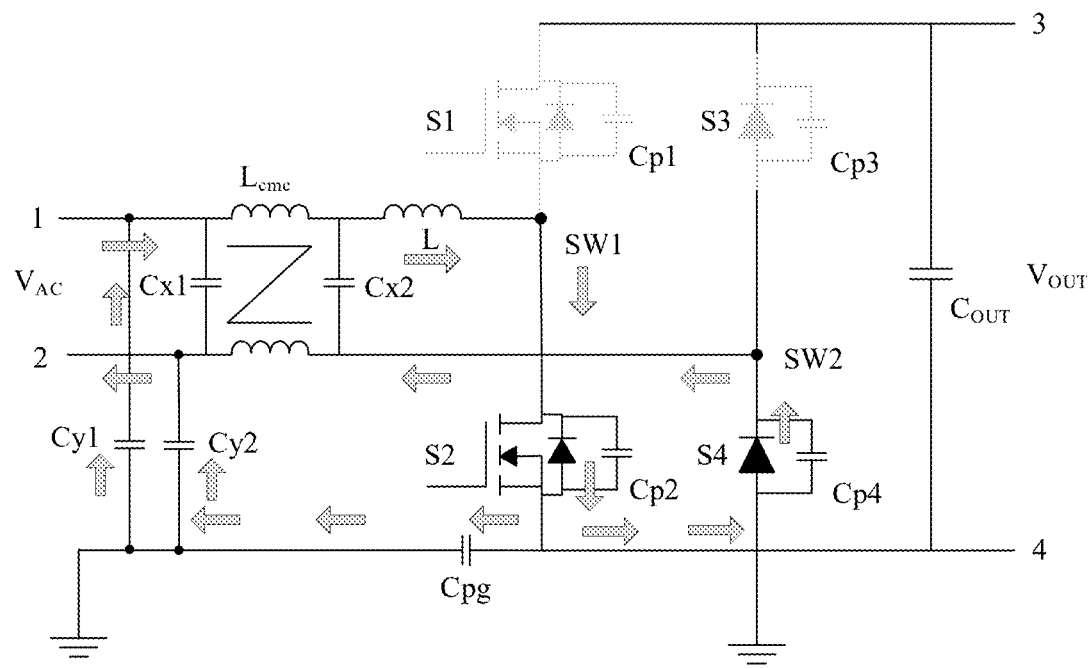
FIG. 2(c) is a schematic diagram of a current flow direction when an input voltage in a totem pole PFC circuit is in a phase of switching from a negative half cycle to a positive half cycle in the conventional technology.

As shown in FIG. 2(c), the input voltage $V_{AC}$ of the totem pole PFC circuit is in a phase of switching from the negative half cycle to the positive half cycle, that is, a case in which "the input end 1 is negative and the input end 2 is positive" changes to a case in which "the input end 1 is positive and the input end 2 is negative". After the surge current generated by the totem pole PFC circuit flows through the PFC inductor L and the switch S2, the totem pole PFC circuit charges the equivalent capacitor to ground Cpg and the parasitic capacitor Cp4 of the switch S4 respectively. A current generated when the Y capacitor to ground Cy1 and the capacitor Cy2 to ground Y discharge is converged to the PFC inductor L. Therefore, the surge current includes two parts. One part is a common mode current that flows through the equivalent capacitor to ground Cpg, the Y capacitor to ground Cy1, and the Y capacitor to ground Cy2, and the other part is a differential mode current that flows through the parasitic capacitor Cp4 of the switch S4.

Figure 2D:
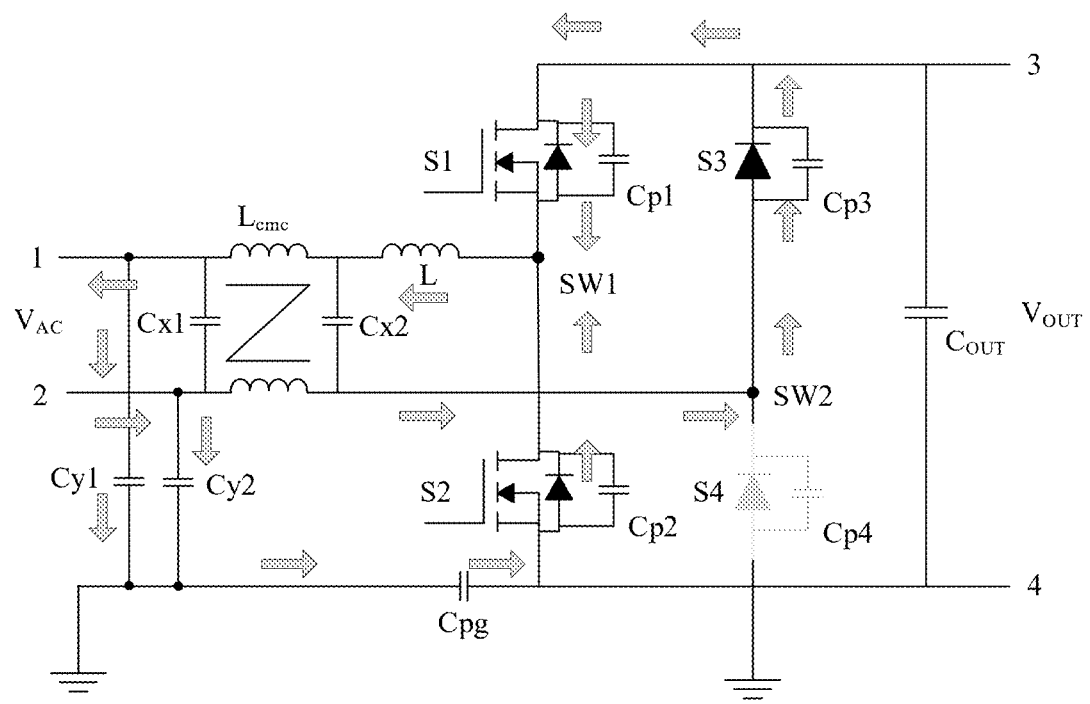
FIG. 2(d) is a schematic diagram of a current flow direction when an input voltage in a totem pole PFC circuit is in a phase of switching from a positive half cycle to a negative half cycle in the conventional technology.

As shown in FIG. 2(d), the input voltage $V_{AC}$ of the totem pole PFC circuit is in a phase of switching from the positive half cycle to the negative half cycle, that is, a case in which "the input end 1 is positive and the input end 2 is negative" changes to a case in which "the input end 1 is negative and the input end 2 is positive". After the surge current generated by the totem pole PFC circuit flows through the node SW2, the surge current charges the parasitic capacitor Cp3 of the switch S3. The current generated when the Y capacitor to ground Cy1 and the Y capacitor to ground Cy2 discharge charges the equivalent capacitor to ground Cpg. The surge current includes two parts. One part is a common mode current that flows through the Y capacitor to ground Cy1, the Y capacitor to ground Cy2, and the equivalent capacitor to ground Cpg, and the other part is a differential mode current that flows through the parasitic capacitor Cp3 of the switch S3.

In a totem pole PFC circuit in the conventional technology, the common mode current and the differential mode current are generated at the same time. As a result, the surge current in the totem pole PFC circuit is relatively large, and components in the totem pole PFC circuit are damaged, thereby reducing reliability of the totem pole PFC circuit. In addition, when the input voltage $V_{AC}$ of the totem pole PFC circuit is switched at zero crossing, the surge current generated when the switch S3 is turned on causes the switch S3 in the totem pole PFC circuit to trigger an overcurrent protection mechanism, and the switch S3 is in an off state. As a result, the totem pole PFC circuit works abnormally. An input end of the totem pole PFC circuit receives an alternating current. Zero-cross switching is a state that a voltage of an alternating current switches from a positive half cycle to a negative half cycle, or from a negative half cycle to a positive half cycle.

To resolve a defect of an existing totem pole PFC circuit, embodiments of this application design a noise suppression method and a noise suppression apparatus for a totem pole PFC circuit. When an input alternating current of the totem pole PFC circuit is switched at zero crossing, a power frequency switch in the totem pole PFC circuit is turned on first, a PFC inductor in the totem pole PFC circuit discharges, and the common mode current is generated when various parasitic capacitors in the totem pole PFC circuit charge or discharge. After the power frequency switch is turned off for a period of time, the power frequency switch is turned on again, and a high frequency switch is turned on.

In this case, the PFC inductor in the totem pole PFC circuit charges to generate the differential mode current. In this application, charge or discharge time of the parasitic capacitor in the totem pole PFC circuit is staggered with energy storage time of the PFC inductor L, to avoid superposition of a charge or discharge current of the parasitic capacitor and an energy storage current of the PFC inductor L, thereby reducing the surge current of the totem pole PFC circuit. When the surge current is reduced, a switch does not trigger the overcurrent protection mechanism, and the totem pole PFC circuit can work normally.

Figure 3:
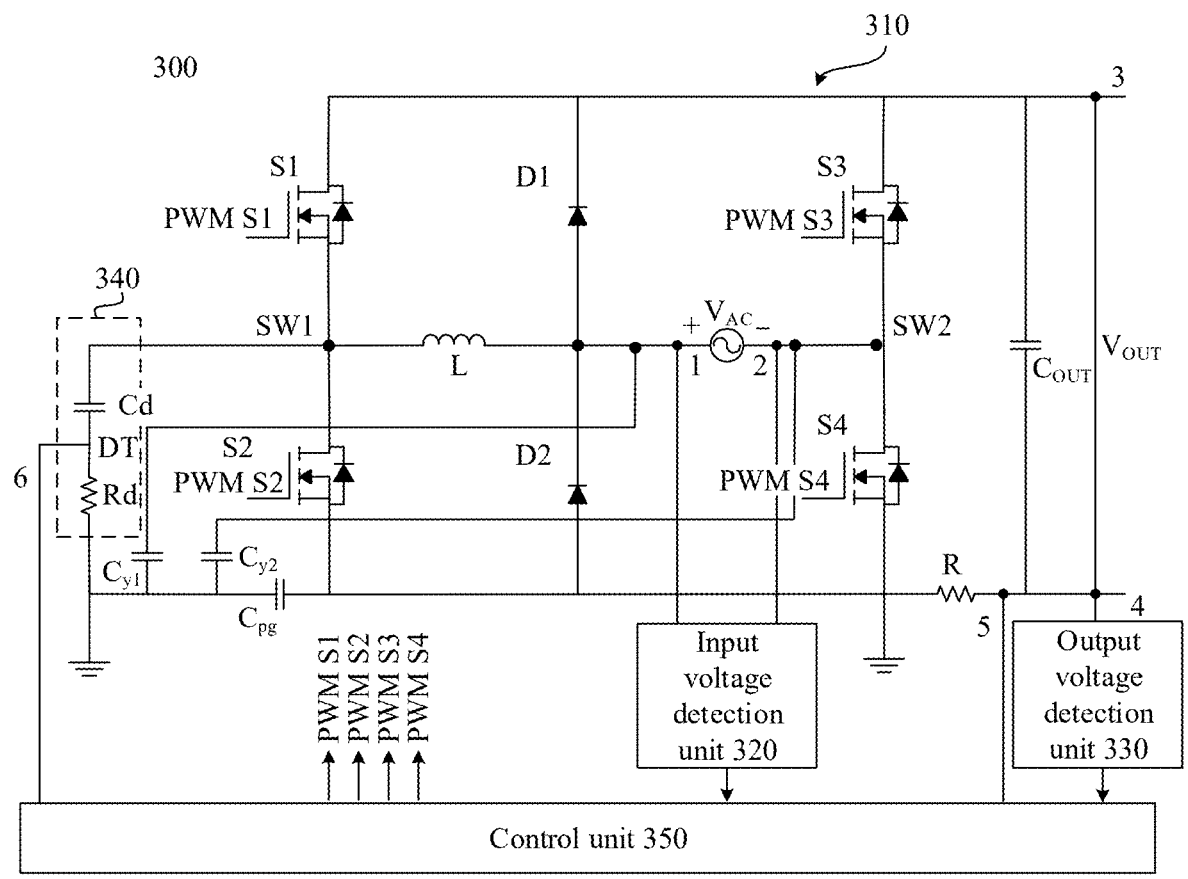
FIG. 3 is a schematic diagram of a structure of a noise suppression apparatus for a totem pole PFC circuit according to an embodiment of this application.

FIG. 3 is a schematic diagram of a structure of a noise suppression apparatus for a totem pole PFC circuit according to an embodiment of this application. As shown in FIG. 3, the noise suppression apparatus 300 for the totem pole PFC circuit includes a totem pole PFC circuit 310, an input voltage detection unit 320, an output voltage detection unit 330, a detection circuit 340, and a control unit 350. The totem pole PFC circuit 310 is configured to convert an input alternating current into a direct current. The input voltage detection unit 320 is coupled to an input end of the totem pole PFC circuit 310, and is configured to: detect a voltage value of a voltage $V_{AC}$ input by the totem pole PFC circuit 310, and send a detection result to the control unit 350. The output voltage detection unit 330 is coupled to an output end of the totem pole PFC circuit 310, and is configured to: detect a voltage value of a voltage $V_{OUT}$ output by the totem pole PFC circuit 310, and send a detection result to the control unit 350. An input end of the detection circuit 340 is electrically connected to the totem pole PFC circuit 310, and an output end of the detection circuit 340 is electrically connected to the control unit 350. The detection circuit 340 is configured to send a voltage value at a node SW1 in the totem pole PFC circuit 310 to the control unit 350. An output end of the control unit 350 is electrically connected to each switch in the totem pole PFC circuit 310, and the control unit 350 is configured to: generate a control signal based on the detection result from the input voltage detection unit 320, the detection result from the output voltage detection unit 330, the voltage value at the node SW1 that is input by the detection circuit 340, and a current value of a resistor R, and send the control signal to each switch in the totem pole PFC circuit 310.

As shown in FIG. 3, the totem pole PFC circuit 310 includes an input end 1, an input end 2, a switch S1, a switch S2, a switch S3, a switch S4, a diode D1, a diode D2, a PFC inductor L, the resistor R, a filter capacitor $C_{OUT}$, an output end 3, and an output end 4. The input end 1 and the input end 2 may be electrically connected to an external power supply, to receive an electrical signal input by the external power supply. The input end 1 and the input end 2 may further be electrically connected to the input voltage detection unit 320. The input voltage detection unit 320 may detect the input voltage value of the voltage $V_{AC}$ through the input end 1 and the input end 2. The switch S1 and the switch S2 are connected in series, and the switch S1 and the switch S2 are electrically connected between the output end 3 and the output end 4. The switch S3 and the switch S4 are connected in series, and the switch S3 and the switch S4 are electrically connected between the output end 3 and the output end 4. The diode D1 and the diode D2 are connected in series, and the diode D1 and the diode D2 are electrically connected between the output end 3 and the output end 4. The filter capacitor $C_{OUT}$ is electrically connected between the output end 3 and the output end 4. The input end 1 is electrically connected to a node between the diode D1 and the diode D2. The input end 2 is electrically connected to a node SW2 between the switch S3 and the switch S4. One end of the PFC inductor L is electrically connected to a node between the diode D1 and the diode D2, and the other end is electrically connected to the node SW1 between the switch S1 and the switch S2. The PFC inductor L can cooperate with other components to reduce a phase difference between a fundamental current input by an alternating current and a voltage, and functions as a rectifier and a filter. The output end 3 and the output end 4 may be electrically connected to a plurality of loads, to supply electrical energy to each load. The output end 3 and the output end 4 may further be electrically connected to the output voltage detection unit 330. The output voltage detection unit 330 may detect the input voltage value of the voltage $V_{OUT}$ through the output end 3 and the output end 4.

In this application, when the totem pole PFC circuit 310 works normally, a parasitic capacitor is generated in the circuit. For ease of understanding, the parasitic capacitor may be equivalent to an equivalent capacitor to ground Cpg, a Y capacitor to ground Cy1, and a Y capacitor to ground Cy2. As shown in FIG. 3, one end of an equivalent capacitor to ground Cpg is electrically connected between the switch S2 and the output end 4, and the other end is grounded. One end of a Y capacitor to ground Cy1 is electrically connected to the input end 1, and the other end is electrically connected to the grounded end of the equivalent capacitor to ground Cpg. One end of a Y capacitor to ground Cy2 is electrically connected to the input end 2, and the other end is electrically connected to the grounded end of the equivalent capacitor to ground Cpg.

The totem pole PFC circuit used in this application is not limited to the structure shown in FIG. 3, and may be another totem pole PFC circuit. This is merely used as an example for description in this application, and does not impose a limitation.

The switch S1, the switch S2, the switch S3, and the switch S4 each generally are, for example, a metal-oxide-semiconductor field-effect transistor (metal-oxide-semiconductor field-effect transistor, MOSFET), an insulated gate bipolar transistor (insulated gate bipolar transistor, IGBT), a diode, or another component. The MOS transistor is used as an example. A gate bootstrap circuit (not shown in the figure) of each MOS transistor is electrically connected. The output end of the control unit 350 is electrically connected to the bootstrap circuit. The control unit 350 may send a pulse width modulation (pulse width modulation, PWM) signal to the bootstrap circuit, so that a bootstrap capacitor in the bootstrap circuit discharges, and the gate of the MOS transistor inputs a current, so that the MOS transistor is in an on state. In this application, the switch S1, the switch S2, the switch S3, and the switch S4 each include a MOS transistor and a diode. One end of the diode is electrically connected to a source of the MOS transistor, and the other end of the diode is electrically connected to a drain of the MOS transistor. A current flowing direction of the MOS transistor is opposite to a current flowing direction of the diode.

As shown in FIG. 3, in the switch S1, a current flowing direction of the diode is "the input end 1→the switch S1", and a current flowing direction of the MOS transistor is "the switch S1→the input end 1". In the switch S2, a current flowing direction of the diode is "the switch S2→the input end 1", and a current flowing direction of the MOS transistor is "the input end 1→the switch S2". In the switch S3, a current flowing direction of the diode is "the input end 2→the switch S3", and a current flowing direction of the MOS transistor is "the switch S3→the input end 2". In the switch S4, a current flowing direction of the diode is "the switch S4→the input end 2", and a current flowing direction of the MOS transistor is "the input end 2→the switch S4".

In this application, the control unit 350 may separately control the MOS transistors in the switch S1, the switch S2, the switch S3, and the switch S4 to be in an on or off state, so that the totem pole PFC circuit 310 can implement four working modes similar to those shown in FIG. 2(a) to FIG. 2(d). Specifically, in an embodiment, the input voltage $V_{AC}$ of the totem pole PFC circuit is in the positive half cycle, and $V_{AC}>0$. In other words, the input end 1 is positive, and the input end 2 is negative. In this case, the MOS transistor in the switch S4 is turned on. When the PFC inductor L charges, the MOS transistor in the switch S1 is turned off, and the MOS transistor in the switch S2 is turned on. In the totem pole PFC circuit 510, a current sequentially flows through the following components: the input end 1→the PFC inductor L→the switch S2→the switch S4→the input end 2.

In an embodiment, the input voltage $V_{AC}$ of the totem pole PFC circuit is in the positive half cycle, and $V_{AC}>0$. In other words, the input end 1 is positive, and the input end 2 is negative. In this case, the MOS transistor in the switch S4 is turned on. When the PFC inductor L discharges, the MOS transistor in the switch S1 is turned on, and the MOS transistor in the switch S2 is turned off. In the totem pole PFC circuit 510, a current sequentially flows through the following components: the input end 1→the PFC inductor L→the switch S→the output end 3→the output end 4→the switch S4→the input end 2.

In an embodiment, the input voltage $V_{AC}$ of the totem pole PFC circuit is in the negative half cycle, and $V_{AC}<0$. In other words, the input end 1 is negative. In this case, the MOS transistor in the switch S3 is turned on. When the PFC inductor L charges, the MOS transistor in the switch S1 is turned on, and the MOS transistor in the switch S2 is turned off. In the totem pole PFC circuit 510, a current sequentially flows through the following components: the input end 2→the switch S3→the switch S1→the PFC inductor L→the input end 1.

In an embodiment, the input voltage $V_{AC}$ of the totem pole PFC circuit is in the negative half cycle, and $V_{AC}<0$. In other words, the input end 1 is negative. In this case, the MOS transistor in the switch S3 is turned on. When the PFC inductor L discharges, the switch S1 in the totem pole PFC circuit is turned off, and the switch S2 is turned on. In the totem pole PFC circuit, a current sequentially flows through the following components: the input end 2→the switch S3→the output end 3→the output end 4→the switch S2→the PFC inductor L→the input end 1.

Figure 4:
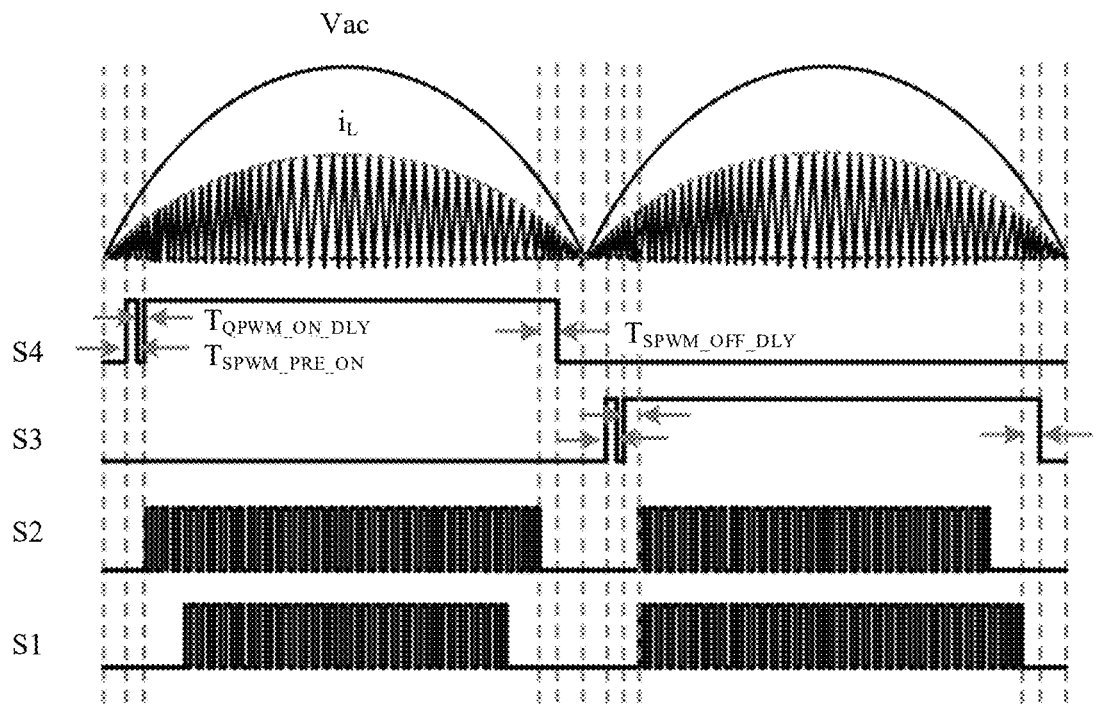
FIG. 4 is a simulation diagram of sending, by a control unit, a control signal to each switch when an input voltage in a totem pole PFC circuit is in a phase of switching from a negative half cycle to a positive half cycle according to an embodiment of this application.
Figure 5A:
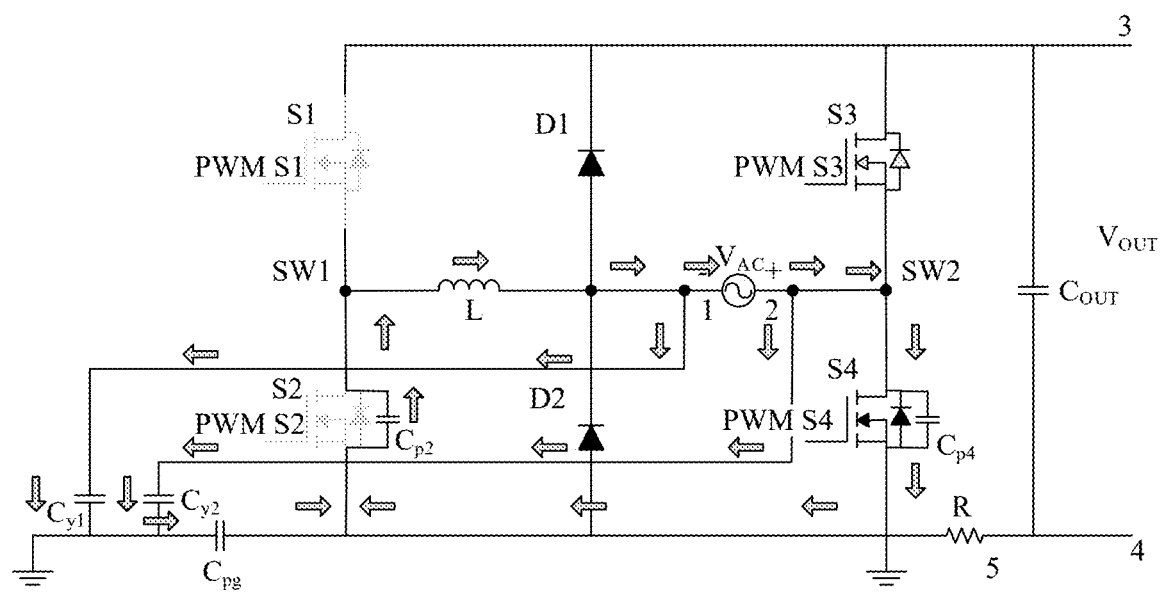
FIG. 5(a) is a schematic diagram of a current flow direction in a first control phase when an input voltage in a totem pole PFC circuit is in a phase of switching from a positive half cycle to a negative half cycle according to an embodiment of this application.
Figure 5B:
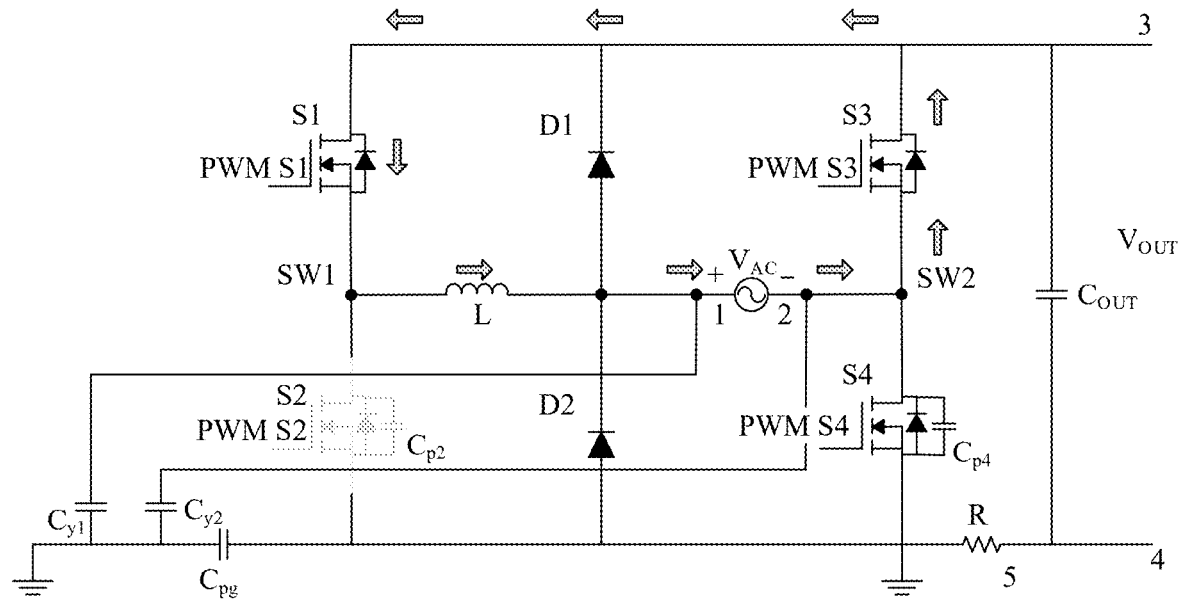
FIG. 5(b) is a schematic diagram of a current flow direction in a second control phase when an input voltage in a totem pole PFC circuit is in a phase of switching from a positive half cycle to a negative half cycle according to an embodiment of this application.
Figure 5C:
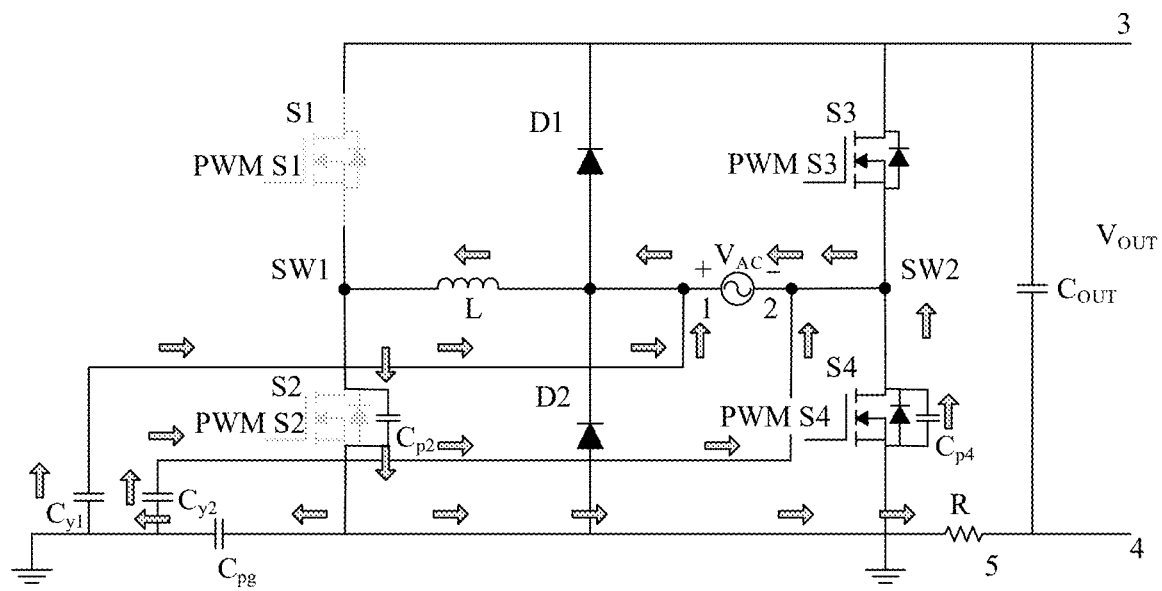
FIG. 5(c) is a schematic diagram of a current flow direction in a first control phase when an input voltage in a totem pole PFC circuit is in a phase of switching from a negative half cycle to a positive half cycle according to an embodiment of this application.
Figure 5D:
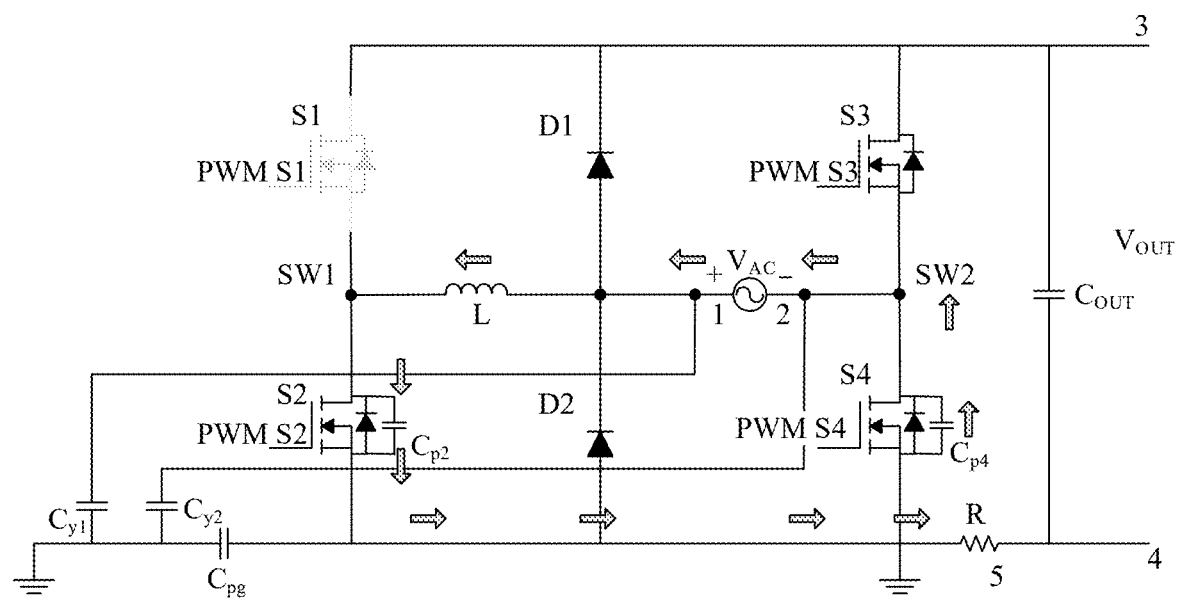
FIG. 5(d) is a schematic diagram of a current flow direction in a second control phase when an input voltage in a totem pole PFC circuit is in a phase of switching from a negative half cycle to a positive half cycle according to an embodiment of this application.

The input voltage $V_{AC}$ of the totem pole PFC circuit 310 is in a phase of switching from the positive half cycle to the negative half cycle. Waveform simulation of PWM signals sent by the control unit 350 to the switch S1, the switch S2, the switch S3, and the switch S4 is shown in FIG. 4.

In this embodiment of this application, for the control unit 350, there are two control phases based on a time sequence of generating a common mode current and generating a differential mode current in the totem pole PFC circuit 310. In a first control phase, the control unit 350 sends a PWM S3 signal to the switch S3, so that the switch S3 is in an on state, and stops sending the PWM S3 signal to the switch S3 after the switch is on for a set period of time TSPWM_PRE_ON, so that the switch S3 is in an off state. The set period of time TSPWM_PRE_ON for being on is generally voltage stabilization time of bridges of the switch S3 and the switch S4.

As shown in FIG. 3(a), in the first control phase, the switch S3 in the totem pole PFC circuit is turned on. The control unit 350 temporarily disables the switch S1 from being turned on, and enables the switch S2 to be turned on. In this case, the PFC inductor L in the totem pole PFC circuit discharges. A surge current generated when the PFC inductor L in the totem pole PFC circuit discharges flows back to the input end 1 after successively flowing through the Y capacitor to ground Cy1, the Y capacitor to ground Cy2, the equivalent capacitor to ground Cpg, a parasitic capacitor Cp2 in the switch S2, and the PFC inductor L, to form a first common mode current circuit. The surge current generated when the PFC inductor L in the totem pole PFC circuit discharges charges a parasitic capacitor Cp4 of the switch S4, and flows back to the input end 1 after flowing through the parasitic capacitor Cp4 in the switch S4, the parasitic capacitor Cp2 in the switch S2, and the PFC inductor L, to form a second common mode current circuit.

In the second common mode current circuit, a conduction speed of the common mode current is related to a conduction speed of the switch S4, and the conduction speed of the common mode current is also a speed at which a voltage $V_{SW2}$ at the node SW2 changes from 0 V to $V_{OUT}$. To reduce the surge current in the totem pole PFC circuit 310, a drive resistance of a gate of the switch S3 may be increased. When the drive resistance of the gate of the switch S3 is increased, the conduction speed of the common mode current in the second common mode current circuit can be reduced, so that the common mode current in the second common mode current circuit is staggered with a common mode current in the first common mode current circuit, thereby reducing the surge current in the totem pole PFC circuit 310.

In a second control phase, after stopping sending the PWM S3 signal to the switch S3, the control unit 350 sends the PWM S3 signal to the switch S3 again after a set period of time TQPWM_ON_DLY, so that the switch S3 is in the on state. When sending the PWM S3 signal to the switch S3 again, the control unit 350 further sends a PWM S1 signal to the switch S1, so that both the switch S3 and the switch S1 are in the on state.

As shown in FIG. 3(b), in the second control phase, after a voltage of a related capacitor in the totem pole PFC circuit 310 becomes stable, the control unit 350 enables the switch S3 in the totem pole PFC circuit to be turned on after a delay of the set period of time TQPWM_ON_DLY. The control unit 350 controls the switch S1 to be turned on and the PFC inductor L to charge. In this case, the PFC inductor L in the totem pole PFC circuit 310 generates the differential mode current during charging. In the totem pole PFC circuit 310, the differential mode current sequentially flows through the following components: the input end 2→the node SW2→the switch S3→the switch S1→the node SW1→the PFC inductor L→the input end 1. The set period of time TQPWM_ON_DLY for the delay is generally dead time between turn-on time and turn-off time of the switch S3 or the switch S4.

In this embodiment of this application, the input voltage $V_{AC}$ of the totem pole PFC circuit 310 is in the phase of switching from the positive half cycle to the negative half cycle. When the input voltage $V_{AC}$ is switched at zero crossing, the control unit 350 enables the switch S3 to be turned on. The control unit 350 first controls the switch S1 not to be turned on and enables the switch S2 to be turned on. Each parasitic capacitor in the totem pole PFC circuit generates the common mode current during charging and discharging. After a voltage of each parasitic capacitor in the totem pole PFC circuit becomes stable, the control unit 350 controls the switch S1 to be turned on. When the PFC inductor L charges, the differential mode current is generated in the totem pole PFC circuit 310. The control unit 350 enables the switch S1 to be turned on by delaying for the set period of time, so that time for generating the common mode current and time for generating the differential mode current in the totem pole PFC circuit can be staggered, thereby reducing the surge current in the totem pole PFC circuit.

After the voltage of each parasitic capacitor in the totem pole PFC circuit becomes stable, the control unit 350 controls the switch S3 to be turned off for a set period of time. After the switch is off for the set period of time, the control unit 350 controls the switch S3 to be turned on again. In the second time of turn-on, the control unit 350 may shield noise generated when the switch S3 is turned on for the first time, to avoid an excessively large surge current that is generated when the switch S3 is turned on for the first time and that causes switch S3 to trigger an overcurrent protection mechanism, which results in an off state of the switch S3 and abnormal operation of the totem pole PFC circuit.

The input voltage $V_{AC}$ of the totem pole PFC circuit 310 is in a phase of switching from the negative half cycle to the positive half cycle. In the first control phase, the control unit 350 sends a PWM S4 signal to the switch S4, so that the switch S4 is in an on state. After the switch S4 is on for the set period of time TSPWM_PRE_ON, the control unit 350 stops sending the PWM S3 signal to the switch S4, so that the switch S4 is in an off state.

As shown in FIG. 3(c), in the first control phase, the switch S4 in the totem pole PFC circuit is turned on. The control unit 350 temporarily disables the switch S2 from being turned on, and enables the switch S1 to be turned on. In this case, the PFC inductor L in the totem pole PFC circuit discharges. The surge current generated when the PFC inductor L in the totem pole PFC circuit discharges flows back to the input end 2 after successively flowing through the PFC inductor L, the parasitic capacitor Cp2 in the switch S2, the equivalent capacitor to ground Cpg, the Y capacitor to ground Cy1, and the Y capacitor to ground Cy2, to form the first common mode current circuit. The surge current generated when the PFC inductor L in the totem pole PFC circuit discharges charges the parasitic capacitor Cp4 of the switch S4, and flows back to the input end 2 after flowing through the PFC inductor L, the parasitic capacitor Cp2 in the switch S2, and the parasitic capacitor Cp4 of the switch S4, to form the second common mode current circuit.

In the second common mode current circuit, the conduction speed of the common mode current is related to the conduction speed of the switch S4, and the conduction speed of the common mode current is also a speed at which the voltage $V_{SW2}$ at the node SW2 changes from $V_{OUT}$ to 0 V. To reduce the surge current in the totem pole PFC circuit 310, a drive resistance of a gate of the switch S4 may be increased. When the drive resistance of the gate of the switch S4 is increased, the conduction speed of the common mode current in the second common mode current circuit may be reduced, so that the common mode current in the second common mode current circuit is staggered with the common mode current in the first common mode current circuit, thereby reducing the surge current in the totem pole PFC circuit 310.

In the second control phase, after stopping sending the PWM S4 signal to the switch S4, the control unit 350 sends the PWM S4 signal to the switch S4 again after the set period of time TQPWM_ON_DLY, so that the switch S4 is in the on state. When sending the PWM S4 signal to the switch S4 again, the control unit 350 further sends a PWM S2 signal to the switch S2, so that both the switch S4 and the switch S2 are in the on state.

As shown in FIG. 3(d), in the second control phase, after the voltage of the related capacitor in the totem pole PFC circuit 310 becomes stable, the control unit 350 enables the switch S4 in the totem pole PFC circuit to be turned on after the delay of the set period of time TQPWM_ON_DLY. The control unit 350 controls the switch S2 to be turned on and the PFC inductor L to charge. In this case, the PFC inductor L in the totem pole PFC circuit 310 generates the differential mode current during charging. In the totem pole PFC circuit 310, the differential mode current sequentially flows through the following components: the input end 1→the node SW1→the switch S2→the switch S4→the node SW2→the input end 2.

In this embodiment of this application, the input voltage $V_{AC}$ of the totem pole PFC circuit 310 is in the phase of switching from the negative half cycle to the positive half cycle. When the input voltage $V_{AC}$ is switched at zero crossing, the switch S4 is turned on. The control unit 350 first controls the switch S2 not to be turned on and enables the switch S1 to be turned on. Each parasitic capacitor in the totem pole PFC circuit generates the common mode current during charging and discharging. After the voltage of each parasitic capacitor in the totem pole PFC circuit becomes stable, the control unit 350 controls the switch S2 to be turned on. When the PFC inductor L charges, the differential mode current is generated in the totem pole PFC circuit 310. The control unit 350 enables the switch S2 to be turned on by delaying for the set period of time, so that the time for generating the common mode current and the time for generating the differential mode current in the totem pole PFC circuit can be staggered, thereby reducing the surge current in the totem pole PFC circuit.

After the voltage of each parasitic capacitor in the totem pole PFC circuit becomes stable, the control unit 350 controls the switch S4 to be turned off for a set period of time. After the switch is off for the set period of time, the control unit 350 controls the switch S4 to be turned on again. In the second time of turn-on, the control unit 350 may shield noise generated when the switch S4 is turned on for the first time, to avoid an excessively large surge current that is generated when the switch S4 is turned on for the first time and that causes the switch S4 to trigger the overcurrent protection mechanism, which results in an off state of the switch S4 and abnormal operation of the totem pole PFC circuit.

Figure 6:
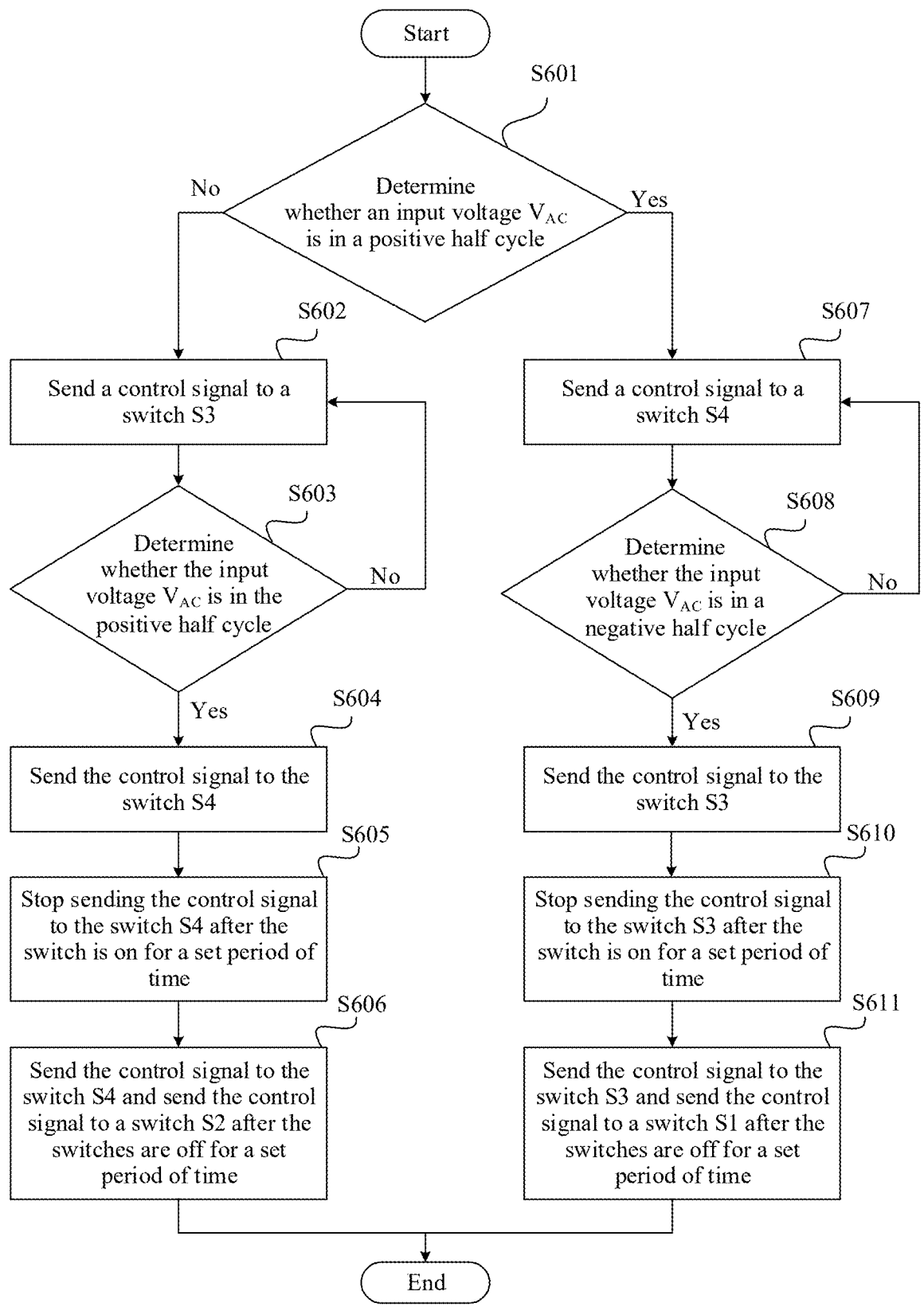
FIG. 6 is a flowchart of a noise suppression method for a totem pole PFC circuit according to an embodiment of this application.

FIG. 6 is a flowchart of a noise suppression method for a totem pole PFC circuit according to an embodiment of this application. As shown in FIG. 6, the method for controlling a totem pole PFC circuit is executed by the control unit 350, and steps executed by the control unit 350 are specifically as follows:

Step S601: Receive an input voltage $V_{AC}$, and determine whether the input voltage $V_{AC}$ is in a positive half cycle. If yes, step S607 is performed; or if no, step S602 is performed.

Step S602: Send a control signal to a switch S3.

Specifically, the control unit 350 receives the input voltage $V_{AC}$ by using an input voltage detection unit 320. If the input voltage $V_{AC}$ at a current moment is in a negative half cycle, the control unit 350 sends the control signal to the switch S3, and enables the switch S3 to be in an on state, so that the control unit 350 controls a switch S1 and a switch S2 to enable a PFC inductor to charge or discharge.

In an example, if when the PFC inductor charges, a MOS transistor in the switch S1 is turned on, and a MOS transistor in the switch S2 is turned off, in a totem pole PFC circuit 510, a current sequentially flows through the following components: an input end 2→a switch S3→the switch S1→a PFC inductor L→an input end 1.

In an example, if when the PFC inductor L discharges, the switch S1 in the totem pole PFC circuit is turned off, and the switch S2 is turned on, in the totem pole PFC circuit, a current sequentially flows through the following components: the input end 2→the switch S3→an output end 3→an output end 4→the switch S2→the PFC inductor L→the input end 1.

Step S603: Determine whether the input voltage $V_{AC}$ is in the positive half cycle. If yes, step S604 is performed; or if no, step S602 is performed.

Step S604: Send the control signal to the switch S4.

Step S605: Stop sending the control signal to the switch S4 after the switch is on for a set period of time.

Specifically, the control unit 350 continuously detects the input voltage $V_{AC}$. If the input voltage $V_{AC}$ is in a phase of switching from the negative half cycle to the positive half cycle, the control unit 350 sends the control signal to the switch S4, so that the switch S4 is in an on state. The control unit 350 temporarily disables the switch S2 from being turned on, and enables the switch S1 to be turned on. In this case, the PFC inductor L in the totem pole PFC circuit discharges.

A surge current generated when the PFC inductor L in the totem pole PFC circuit discharges flows back to the input end 2 after successively flowing through the PFC inductor L, a parasitic capacitor Cp2 in the switch S2, an equivalent capacitor to ground Cpg, a Y capacitor to ground Cy1, and a Y capacitor to ground Cy2, to form a first common mode current circuit. The surge current generated when the PFC inductor L in the totem pole PFC circuit discharges charges a parasitic capacitor Cp4 of the switch S4, and flows back to the input end 2 after flowing through the PFC inductor L, a parasitic capacitor Cp2 in the switch S2, and the parasitic capacitor Cp4 of the switch S4, to form a second common mode current circuit.

In the second common mode current circuit, a conduction speed of a common mode current is related to a conduction speed of the switch S4, and the conduction speed of the common mode current is also a speed at which a voltage $V_{SW2}$ at a node SW2 changes from $V_{OUT}$ to 0 V. To reduce the surge current in the totem pole PFC circuit 310, a drive resistance of a gate of the switch S4 may be increased. When the drive resistance of the gate of the switch S4 is increased, the conduction speed of the common mode current in the second common mode current circuit can be reduced, so that the common mode current in the second common mode current circuit is staggered with a common mode current in the first common mode current circuit, thereby reducing the surge current in the totem pole PFC circuit 310.

Step S606: After the switches are off for a set period of time, send the control signal to the switch S4 and send the control signal to the switch S2.

Specifically, after a voltage of a related capacitor in the totem pole PFC circuit 310 becomes stable, the control unit 350 sends a PWM S4 signal to the switch S4 again after delaying the set period of time TQPWM_ON_DLY, so that the switch S4 is in an on state. When sending the PWM S4 signal to the switch S4 again, the control unit 350 further sends a PWM S2 signal to the switch S2, so that both the switch S4 and the switch S2 are in an on state. In this case, the PFC inductor L in the totem pole PFC circuit 310 generates a differential mode current during charging. In the totem pole PFC circuit 310, the differential mode current sequentially flows through the following components: the input end 1→the node SW1→the switch S2→the switch S4→the node SW2→the input end 2.

The input voltage $V_{AC}$ of the totem pole PFC circuit 310 is in the phase of switching from the negative half cycle to the positive half cycle. When the input voltage $V_{AC}$ is switched at zero crossing, the control unit 350 enables the switch S4 to be turned on. The control unit 350 first controls the switch S2 not to be turned on and enables the switch S1 to be turned on. Each parasitic capacitor in the totem pole PFC circuit generates a common mode current during charging and discharging. After a voltage of each parasitic capacitor in the totem pole PFC circuit becomes stable, the control unit 350 controls the switch S2 to be turned on. When the PFC inductor L charges, the differential mode current is generated in the totem pole PFC circuit 310. The control unit 350 enables the switch S2 to be turned on by delaying for the set period of time, so that time for generating the common mode current and time for generating the differential mode current in the totem pole PFC circuit can be staggered, thereby reducing the surge current in the totem pole PFC circuit.

After the voltage of each parasitic capacitor in the totem pole PFC circuit becomes stable, the control unit 350 controls the switch S4 to be turned off for the set period of time. After the switch is off for the set period of time, the control unit 350 controls the switch S4 to be turned on again. In a second time of turn-on, the control unit 350 may shield noise generated when the switch S4 is turned on for a first time, to avoid an excessively large surge current that is generated when the switch S4 is turned on for the first time and that the switch S4 triggers an overcurrent protection mechanism, which results in an off state of the switch S4 and abnormal operation of the totem pole PFC circuit.

Step S607: Send the control signal to the switch S4.

Specifically, if the input voltage $V_{AC}$ at a current moment is in the positive half cycle, the control unit 350 sends the control signal to the switch S4, and enables the switch S4 to be in an on state, so that the control unit 350 controls the switch S1 and the switch S2 to enable the PFC inductor to charge or discharge.

In an example, if when the PFC inductor charges, the MOS transistor in the switch S1 is turned off, and the MOS transistor in the switch S2 is turned on, in the totem pole PFC circuit 510, a current sequentially flows through the following components: the input end 1→the PFC inductor L→the switch S2→the switch S4→the input end 2.

In an example, if when the PFC inductor L discharges, the MOS transistor in the switch S1 is turned on, and the MOS transistor in the switch S2 is turned off, in the totem pole PFC circuit 510, a current sequentially flows through the following components: the input end 1→the PFC inductor L→the switch S1→the output end 3→the output end 4→the switch S4→the input end 2.

Step S608: Determine whether the input voltage $V_{AC}$ is in the negative half cycle. If yes, step S609 is performed; or if no, step S607 is performed.

Step S609: Send the control signal to the switch S3.

Step S610: Stop sending the control signal to the switch S3 after the switch is on for the set period of time.

Specifically, the control unit 350 continuously detects the input voltage $V_{AC}$. If the input voltage $V_{AC}$ is in a phase of switching from the positive half cycle to the negative half cycle, the control unit 350 sends the control signal to the switch S3, so that the switch S3 is in an on state. The control unit 350 temporarily disables the switch S1 from being turned on, and enables the switch S2 to be turned on. In this case, the PFC inductor L in the totem pole PFC circuit discharges.

The surge current generated when the PFC inductor L in the totem pole PFC circuit discharges flows back to the input end 1 after successively flowing through the Y capacitor to ground Cy1, the Y capacitor to ground Cy2, the equivalent capacitor to ground Cpg, the parasitic capacitor Cp2 in the switch S2, and the PFC inductor L, to form the first common mode current circuit. The surge current generated when the PFC inductor L in the totem pole PFC circuit discharges charges the parasitic capacitor Cp4 of the switch S4, and flows back to the input end 1 after flowing through the parasitic capacitor Cp4 of the switch S4, the parasitic capacitor Cp2 in the switch S2, and the PFC inductor L, to form the second common mode current circuit.

In the second common mode current circuit, the conduction speed of the common mode current is related to the conduction speed of the switch S4, and the conduction speed of the common mode current is also a speed at which the voltage $V_{SW2}$ at the node SW2 changes from 0 V to $V_{OUT}$. To reduce the surge current in the totem pole PFC circuit 310, a drive resistance of a gate of the switch S3 may be increased. When the drive resistance of the gate of the switch S3 is increased, the conduction speed of the common mode current in the second common mode current circuit can be reduced, so that the common mode current in the second common mode current circuit is staggered with the common mode current in the first common mode current circuit, thereby reducing the surge current in the totem pole PFC circuit 310.

Step S611: After the switches are off for the set period of time, send the control signal to the switch S3 and send the control signal to the switch S1.

Specifically, after the voltage of the related capacitor in the totem pole PFC circuit 310 becomes stable, the control unit 350 sends a PWM S3 signal to the switch S3 again after delaying the set period of time TQPWM_ON_DLY, so that the switch S3 is in an on state. When sending the PWM S3 signal to the switch S3 again, the control unit 350 further sends a PWM S1 signal to the switch S1, so that both the switch S3 and the switch S1 are in an on state. In this case, the PFC inductor L in the totem pole PFC circuit 310 generates the differential mode current during charging. In the totem pole PFC circuit 310, the differential mode current sequentially flows through the following components: the input end 2→the node SW2→the switch S3→the switch S1→the node SW1→the PFC inductor L→the input end 1.

The input voltage $V_{AC}$ of the totem pole PFC circuit 310 is in the phase of switching from the positive half cycle to the negative half cycle. When the input voltage $V_{AC}$ is switched at zero crossing, the control unit 350 enables the switch S3 to be turned on. The control unit 350 first controls the switch S1 not to be turned on and enables the switch S2 to be turned on. Each parasitic capacitor in the totem pole PFC circuit generates the common mode current during charging and discharging. After the voltage of each parasitic capacitor in the totem pole PFC circuit becomes stable, the control unit 350 controls the switch S1 to be turned on. When the PFC inductor L charges, the differential mode current is generated in the totem pole PFC circuit 310. The control unit 350 enables the switch S1 to be turned on by delaying for the set period of time, so that the time for generating the common mode current and the time for generating the differential mode current in the totem pole PFC circuit can be staggered, thereby reducing the surge current in the totem pole PFC circuit.

After the voltage of each parasitic capacitor in the totem pole PFC circuit becomes stable, the control unit 350 controls the switch S3 to be turned off for the set period of time. After the switch is off for the set period of time, the control unit 350 controls the switch S3 to be turned on again. In a second time of turn-on, the control unit 350 may shield noise generated when the switch S3 is turned on for a first time, to avoid an excessively large surge current that is generated when the switch S3 is turned on for the first time and that causes the switch S3 to trigger an overcurrent protection mechanism, which results in an off state of the switch S3 and abnormal operation of the totem pole PFC circuit.

An embodiment of this application provides an electronic device. The electronic device includes a noise suppression apparatus for a totem pole PFC circuit. The noise suppression apparatus for the totem pole PFC circuit may be the noise suppression apparatus for the totem pole PFC circuit recorded in FIG. 3 to FIG. 6 and the foregoing corresponding protection solutions. The electronic device includes the noise suppression apparatus for the totem pole PFC circuit, therefore, the electronic device package has all or at least some of advantages of the noise suppression apparatus for the totem pole PFC circuit. The electronic device may be a base station, a charging pile, a switch, an electric vehicle, or the like. This is not limited in this application.

In the descriptions of this specification, the described specific features, structures, materials, or characteristics may be combined in a proper manner in any one or more of embodiments or examples.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A noise suppression method for a totem pole power factor correction (PFC) circuit comprising:
   sampling an alternating current at an input end of the totem pole PFC circuit;
   sending a control signal to a third switch or a fourth switch in response to a determination that a voltage of the alternating current at the input end is switched at a zero crossing in which the voltage of the alternating current switches from a positive half cycle to a negative half cycle or from the negative half cycle to the positive half cycle, wherein the third switch enables a PFC inductor in the totem pole PFC circuit to charge or discharge when the voltage of the alternating current is in the negative half cycle, the fourth switch enables the PFC inductor to charge or discharge when the voltage of the alternating current is in the positive half cycle, and the control signal causes the third switch or the fourth switch to be in an on state;
   stopping sending the control signal to the third switch or the fourth switch after the third switch or the fourth switch is on for a first set period of time; and
   sending the control signal to the third switch or the fourth switch after the third switch or the fourth switch is off for a second set period of time.

2. The method according to claim 1, further comprising:
   after the sending the control signal to the third switch in response to the determination that the voltage of the alternating current at the input end is switched at the zero crossing, sending the control signal to a second switch that enables the PFC inductor to discharge when the voltage of the alternating current is in the negative half cycle or that enables the PFC inductor to charge when the voltage of the alternating current is in the positive half cycle; or
   after the sending the control signal to the fourth switch in response to the determination that the voltage of the alternating current at the input end is switched at the zero crossing, sending the control signal to a first switch that enables the PFC inductor to charge when the voltage of the alternating current is in the negative half cycle, or enables the PFC inductor to discharge when the voltage of the alternating current is in the positive half cycle.

3. The method according to claim 2, further comprising:
   after the sending the control signal to the third switch after the third switch is off for the second set period of time, sending the control signal to the first switch; or
   after the sending the control signal to the fourth switch after the fourth switch is off for the second set period of time, sending the control signal to the second switch.

4. The method according to claim 1, wherein:
   the third switch and the fourth switch each comprise a MOS transistor; and
   the method further comprises before or after the sending the control signal to the third switch or the fourth switch in response to the determination that the voltage of the alternating current at the input end is switched at the zero crossing, increasing a resistance of a gate of the MOS transistor in the third switch or the MOS transistor in the fourth switch.

5. An apparatus for noise suppressed power factor correction (PFC) comprising:
   a totem pole PFC circuit;
   an input voltage detection circuit; and
   a control circuit, wherein:
   the input voltage detection circuit is configured to sample an alternating current at an input end of the totem pole PFC circuit, and provide a voltage of the alternating current to the control circuit, and
   the control circuit is configured to:
   send a control signal to a third switch or a fourth switch in response to a determination that the voltage of the alternating current at the input end is switched at a zero crossing in which the voltage of the alternating current switches from a positive half cycle to a negative half cycle or from the negative half cycle to the positive half cycle, the third switch is configured to enable a PFC inductor in the totem pole PFC circuit to charge or discharge when the voltage of the alternating current is in the negative half cycle, the fourth switch is configured to enable the PFC inductor to charge or discharge when the voltage of the alternating current is in the positive half cycle, and the control signal is configured to enable the third switch or the fourth switch to be in an on state,
   stop sending the control signal to the third switch or the fourth switch after the third switch or the fourth switch is on for a first set period of time, and send the control signal to the third switch or the fourth switch after the third switch or the fourth switch is off for a second set period of time.

6. The apparatus according to claim 5, wherein the control circuit is further configured to:
after sending the control signal to the third switch in response to the determination that the voltage of the alternating current at the input end is switched at the zero crossing, send the control signal to a second switch, wherein the second switch is configured to enable the PFC inductor to discharge when the voltage of the alternating current is in the negative half cycle or is configured to enable the PFC inductor to charge when the voltage of the alternating current is in the positive half cycle; or
after sending the control signal to the fourth switch in response to the determination that the voltage of the alternating current at the input end is switched at the zero crossing, send the control signal to a first switch configured to enable the PFC inductor to charge when the voltage of the alternating current is in the negative half cycle or configured to enable the PFC inductor to discharge when the voltage of the alternating current is in the positive half cycle.

7. The apparatus according to claim 6, wherein the control circuit is further configured to:
after sending the control signal to the third switch after the third switch is off for the second set period of time, send the control signal to the first switch; or
after sending the control signal to the fourth switch after the fourth switch is off for the second set period of time, send the control signal to the second switch.

8. The apparatus according to claim 5, wherein:
the third switch and the fourth switch each comprise a MOS transistor; and
the control circuit is further configured to increase a resistance of a gate of the MOS transistor in the third switch or the MOS transistor in the fourth switch.

9. The apparatus according to claim 5, wherein the totem pole PFC circuit comprises:
the third switch having a load path coupled between an output node and a first input node; and
the fourth switch having a load path coupled between the first input node and a reference node.

10. The apparatus according to claim 9, wherein the totem pole PFC circuit further comprises:
the PFC inductor coupled between a second input node and a common node;
a first switch coupled between the output node and the common node; and
a second switch coupled between the common node and the reference node.

11. The apparatus according to claim 10, wherein the totem pole PFC circuit further comprises:
a first diode coupled between the output node and the second input node; and
a second diode coupled between the second input node and the reference node.

12. The apparatus according to claim 10, wherein the input voltage detection circuit comprises a first input terminal coupled to the first input node and a second input terminal coupled to the second input node.

13. An electronic device, comprising at least one power factor correction (PFC) apparatus with noise suppression, the at least one PFC apparatus with noise suppression comprising a totem pole PFC circuit, an input voltage detection circuit, and a control circuit, wherein:

the input voltage detection circuit is configured to: sample an alternating current at an input end of the totem pole PFC circuit, and provide a voltage of the alternating current to the control circuit; and
the control circuit is configured to:
send a control signal to a third switch or a fourth switch in response to a determination that the voltage of the alternating current at the input end is switched at a zero crossing in which the voltage of the alternating current switches from a positive half cycle to a negative half cycle or from the negative half cycle to the positive half cycle, the third switch is configured to enable a PFC inductor in the totem pole PFC circuit to charge or discharge when the voltage of the alternating current is in the negative half cycle, the fourth switch is configured to enable the PFC inductor to charge or discharge when the voltage of the alternating current is in the positive half cycle, and the control signal is configured to enable the third switch or the fourth switch to be in an on state;
stop sending the control signal to the third switch or the fourth switch after the third switch or the fourth switch is on for a first set period of time; and
send the control signal to the third switch or the fourth switch after the third switch or the fourth switch is off for a second set period of time.

14. The device according to claim 13, wherein the control circuit is further configured to:
after sending the control signal to the third switch based on the determination that the voltage of the alternating current at the input end is switched at the zero crossing, send the control signal to a second switch configured to enable the PFC inductor to discharge when the voltage of the alternating current is in the negative half cycle or configured to enable the PFC inductor to charge when the voltage of the alternating current is in the positive half cycle; or
after sending the control signal to the fourth switch based on the determination that the voltage of the alternating current at the input end is switched at the zero crossing, send the control signal to a first switch configured to enable the PFC inductor to charge when the voltage of the alternating current is in the negative half cycle or configured to enable the PFC inductor to discharge when the voltage of the alternating current is in the positive half cycle.

15. The device according to claim 14, wherein the control circuit is further configured to:
after sending the control signal to the third switch after the third switch is off for the second set period of time, send the control signal to the first switch; or
after sending the control signal to the fourth switch after the fourth switch is off for the second set period of time, send the control signal to the second switch.

16. The device according to claim 13, wherein:
the third switch and the fourth switch each comprise a MOS transistor; and
the control circuit is further configured to increase a resistance of a gate of the MOS transistor in the third switch or the MOS transistor in the fourth switch.

17. The device according to claim 13, wherein the totem pole PFC circuit comprises:
the third switch having a load path coupled between an output node and a first input node; and
the fourth switch having a load path couple between the first input node and a reference node.

18. The device according to claim 17, wherein the totem pole PFC circuit further comprises:
   the PFC inductor coupled between a second input node and a common node;
   a first switch coupled between the output node and the common node; and
   a second switch coupled between the common node and the reference node.

19. The device according to claim 18, wherein the totem pole PFC circuit further comprises:
   a first diode coupled between the output node and the second input node; and
   a second diode coupled between the second input node and the reference node.

20. The device according to claim 18, wherein the input voltage detection circuit comprises a first input terminal coupled to the first input node and a second input terminal coupled to the second input node.

\* \* \* \* \*